(12) United States Patent
Janabi et al.

(10) Patent No.: US 11,309,791 B2
(45) Date of Patent: Apr. 19, 2022

(54) SYSTEMS AND METHODS FOR VOLTAGE CONVERSION IMPLEMENTING A SWITCHED-CAPACITOR CIRCUIT

(71) Applicant: Board of Trustees of Michigan State University, East Lansing, MI (US)

(72) Inventors: Ameer Janabi, Lansing, MI (US); Bingsen Wang, Okemos, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 143 days.

(21) Appl. No.: 16/787,623

(22) Filed: Feb. 11, 2020

(65) Prior Publication Data
US 2020/0266703 A1 Aug. 20, 2020

Related U.S. Application Data

(60) Provisional application No. 62/806,224, filed on Feb. 15, 2019.

(51) Int. Cl.
| | | |
|---|---|---|
| *H02M 7/06* | (2006.01) | |
| *H02M 3/07* | (2006.01) | |
| *H02M 5/458* | (2006.01) | |
| *H02M 7/5387* | (2007.01) | |
| *H02P 27/06* | (2006.01) | |

(52) U.S. Cl.
CPC ............ *H02M 3/07* (2013.01); *H02M 5/4585* (2013.01); *H02M 7/5387* (2013.01); *H02P 27/06* (2013.01)

(58) Field of Classification Search
CPC .... H02M 3/07; H02M 5/4585; H02M 7/5387; H02M 5/458; H02M 1/007; H02P 27/06; H02P 2201/09
See application file for complete search history.

(56) References Cited

U.S. PATENT DOCUMENTS

| | | | |
|---|---|---|---|
| 8,619,447 B2 | 12/2013 | Wang et al. | |
| 9,431,924 B2 | 8/2016 | Wang | |
| 2011/0242867 A1* | 10/2011 | Wang | H02M 7/48 363/131 |
| 2017/0054364 A1* | 2/2017 | Ferdowsi | H02M 3/158 |
| 2017/0267111 A1* | 9/2017 | Ochi | H02J 7/02 |
| 2018/0154787 A1* | 6/2018 | Chen | H02M 1/15 |
| 2019/0379296 A1* | 12/2019 | Ge | B60L 15/007 |

\* cited by examiner

*Primary Examiner* — Muhammad S Islam
(74) *Attorney, Agent, or Firm* — Harness Dickey & Pierce PLC

(57) ABSTRACT

A voltage conversion system including a source configured to supply a voltage and a switch capacitor circuit electrically coupled to the source. The switch capacitor circuit is configured to switch between a discharging state and a charging state. The switching between the discharging state and the charging state produces a boost to the supplied voltage. The voltage conversion system includes a capacitor in the switch capacitor circuit configured to store charge during the charging state and drain charge during the discharging state. The voltage conversion system includes a switching arrangement having a plurality of switch pairs configured to supply a converted voltage to a load. The switch capacitor circuit and the switching arrangement are interfaced to produce a unified circuit.

6 Claims, 21 Drawing Sheets

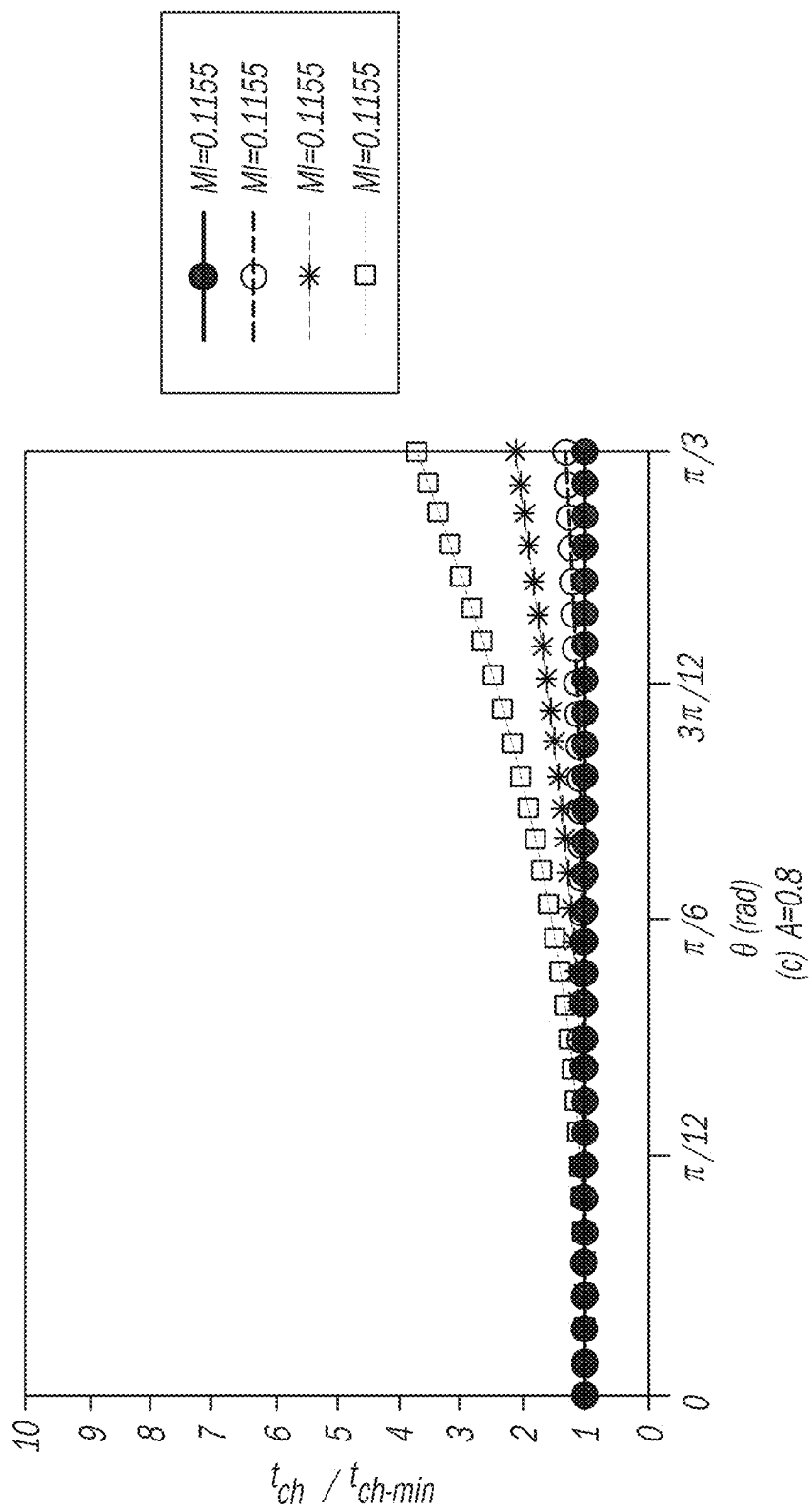

SYSTEMS AND METHODS FOR VOLTAGE CONVERSION IMPLEMENTING A SWITCHED-CAPACITOR CIRCUIT

CROSS-REFERENCE

This application claims the benefit of U.S. Provisional Application 62/806,224, filed Feb. 15, 2019. The entire disclosure of the above application is incorporated herein by reference.

FIELD

The present disclosure relates to voltage conversion and more specifically to a bidirectional switch capacitor buck-boost voltage converter.

BACKGROUND

Voltage source inverters are inherently buck converters. Therefore, the DC-link voltage has to be greater than the DC or AC input voltage. For applications where the available DC voltage is limited, an additional DC-DC boost converter is needed to obtain the desirable AC voltage. With respect to the commercial traction electric drive system, only two configurations are used. The first configuration is a battery directly powering a two-level inverter. The second configuration is a battery connected to the inverter with intermediate DC-DC boost stage, as shown in FIG. 1.

The first configuration offers minimum stress on the inverter side but requires an expensive battery with a large number of cells in series to achieve the necessary DC-link voltage. The series connection of battery cells poses a challenge during charging, leading to more complex battery management system (BMS) requirements. Especially during fast charging. Furthermore, isolation of one faulty cell in the series connection leads to a voltage drop in the overall series connection. In this case, the entire series row of the battery needs to be disconnected from the DC-link in order to not create a short circuit with other non-faulty series rows of cells of the battery. The first configuration is seen only in extended-range electric vehicle (with large batteries greater than 50 kWh).

On the other hand, the second configuration used in hybrid electric vehicles (HEVs) and plug-in HEVs where the battery rating is small, such as from 5 kWh to 50 kWh. While the current limit in the machine is dependent on its ability to dissipate the heat, the voltage limit is dependent on the DC-link voltage. Therefore, using DC-DC boost converter allows extending the constant torque characteristics. Furthermore, reducing the current rating of the switches or the need for connecting several switches in parallel. There has been a trend to increase the battery voltage up to 800V to achieve rapid charging. Also, owing to the superior current density characteristics of the SiC-MOSFET compared to the Si-IGBT, the current density of the 1200V SiC-MOSFET is similar to the current density of the lower-voltage 600V Si-IGBT. This advantage leads to a reduction in semiconductor die area by a factor of two by means of utilizing a high voltage motor and SiC-MOSFET. Furthermore, the reduced current peak at the higher voltage leads to smaller peak losses by a factor of four. Since loss translates directly into cooling system capacity, a significant reduction in cooling system size and weight as well as an improvement in EV range occurs.

However, the conventional boost stage depicted in FIG. 1 is not quite perfect. The power rating of the DC-DC converter must match the battery pack power, leading to a proportionally large inductor. The inductor is usually heavy and costly. Furthermore, the inductor copper and core losses increase proportionally with the size of the inductor. When boosting by a high voltage ratio, the boost converter must operate with a high duty cycle where the efficiency is relatively low. The partial-power efficiency is also poor because of AC losses (switching loss and AC magnetic loss) that depend on voltage but are nearly independent of current. At high duty cycles, the RMS current applied to the bus capacitor is also quite high, impacting the size and cost of this capacitor.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A voltage conversion system including a source configured to supply a voltage and a switch capacitor circuit electrically coupled to the source. The switch capacitor circuit is configured to switch between a discharging state and a charging state. The switching between the discharging state and the charging state produces a boost to the supplied voltage. The voltage conversion system includes a capacitor in the switch capacitor circuit configured to store charge during the charging state and drain charge during the discharging state. The voltage conversion system includes a switching arrangement having a plurality of switch pairs configured to supply a converted voltage to a load. The switch capacitor circuit and the switching arrangement are interfaced to produce a unified circuit.

In other features, the switch capacitor circuit includes a first switch, a second switch electrically coupled to the first switch at a first point, and a switch capacitor electrically coupled between the first switch and the capacitor. In other features, the capacitor is electrically coupled to the first switch and the second switch at the first point. In other features, the capacitor and the switching arrangement are in a series configuration during the charging state. In other features, a charging current travels through a diode of a switch capacitor connected in a parallel configuration with the capacitor. In other features, a second switch is activated to charge the capacitor.

In other features, the capacitor and the switching arrangement are in a parallel configuration during the discharging state. In other features, a first switch is activated to discharge the capacitor. In other features, the load is a motor within a vehicle. In other features, the switch capacitor circuit is configured to convert at least one of direct current to alternating current, alternating current to direct current, alternating current to alternating current, and direct current to direct current. In other features, the switching arrangement is a three-level inverter.

A voltage conversion method includes supplying a voltage from a source and switching, using a switch capacitor circuit, between a discharging state and a charging state. The method includes generating a converted voltage of the supplied voltage in response to the switching between the discharging state and the charging state. The converted voltage is a boosted voltage. The method includes, during the charging state, storing a charge on a capacitor and, during the discharging state, discharging the charge stored in the capacitor. The method includes supplying the converted voltage to a load via a switching arrangement. The switch capacitor circuit and the switching arrangement are interfaced to produce a unified circuit.

In other features, the switch capacitor circuit includes a first switch, a second switch electrically coupled to the first switch at a first point, and a switch capacitor electrically coupled between the first switch and the capacitor. In other features, the capacitor is electrically coupled to the first switch and the second switch at the first point. In other features, the capacitor and the switching arrangement are in a series configuration during the charging state. In other features, a charging current travels through a diode of a switch capacitor connected in a parallel configuration with the capacitor. In other features, a second switch is activated to charge the capacitor.

In other features, the capacitor and the switching arrangement are in a parallel configuration during the discharging state. In other features, a first switch is activated to discharge the capacitor. In other features, the load is a motor within a vehicle. In other features, the switch capacitor circuit is configured to convert at least one of direct current to alternating current, alternating current to direct current, alternating current to alternating current, and direct current to direct current.

A voltage conversion system including a source configured to supply a voltage and a switch capacitor circuit electrically coupled to the source. The switch capacitor circuit is configured to switch between a discharging state and a charging state. The switching between the discharging state and the charging state produces a boost to the supplied voltage. The voltage conversion system includes a capacitor in the switch capacitor circuit configured to store charge during the charging state and drain charge during the discharging state. The voltage conversion system includes a switching arrangement having a plurality of switch pairs configured to supply a converted voltage to a motor. The capacitor is in a parallel configuration with the motor during the charging state and the capacitor is in a series configuration with the motor during the discharging state. The switching arrangement is a three-level inverter, and the switch capacitor circuit and the switching arrangement are interfaced to produce a unified circuit.

Notably, the switch capacitor circuit is used without any output filter capacitor and without a reverse blocking diode. This is an important distinction between the presently disclosed circuit and conventional switch capacitor circuits. Furthermore, the switch capacitor circuit is not an isolated stage of DC-DC boost converter. Instead, the switching capacitor and the inverter legs form one unit that is controlled in fashion similar to multilevel converters.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIGS. 7A-7D are graphs depicting a charging time with respect to a minimum charging time with varying boost factor (A) and modulation index ($M_i$).

In the drawings, reference numbers may be reused to identify similar and/or identical elements.

DETAILED DESCRIPTION

An improved switch capacitor (SC) voltage boost converter and control method for implementing a DC-AC power conversion is presented. The SC buck-boost voltage source converter includes a power source, a main circuit, and a SC circuit. The SC converter is bidirectional and can operate as a DC-AC inverter or an AC-DC rectifier. The SC converter is configured such that the SC converter can buck and boost the voltage.

The SC converter employs an SC circuit augmented with the main converter circuit electrically coupled to the power source, such as a battery, thus providing unique features that cannot be attained by a traditional voltage-source inverter (VSI) or boost VSI. The additional features include doubling the area of the linear modulation region. The SC converter eliminates the need for a large inductor in the boost DC-DC stage and a large filtering capacitor, leading to a higher energy density and lower cost.

Additionally, conventional SC techniques are limited to low power applications, such as less than 100 W, because a high current in the charging stage may destroy the switches. That is, a voltage drop occurs when draining a capacitor during a discharging state, resulting in a very high current being produced to charge the capacitor during a following charging state. However, as shown in the SC converter of the present disclosure, the SC circuit is designed to limit a charging current, allowing for a variety of high-power applications, such as in the 10 kW to 20 kW range.

Figure 1:
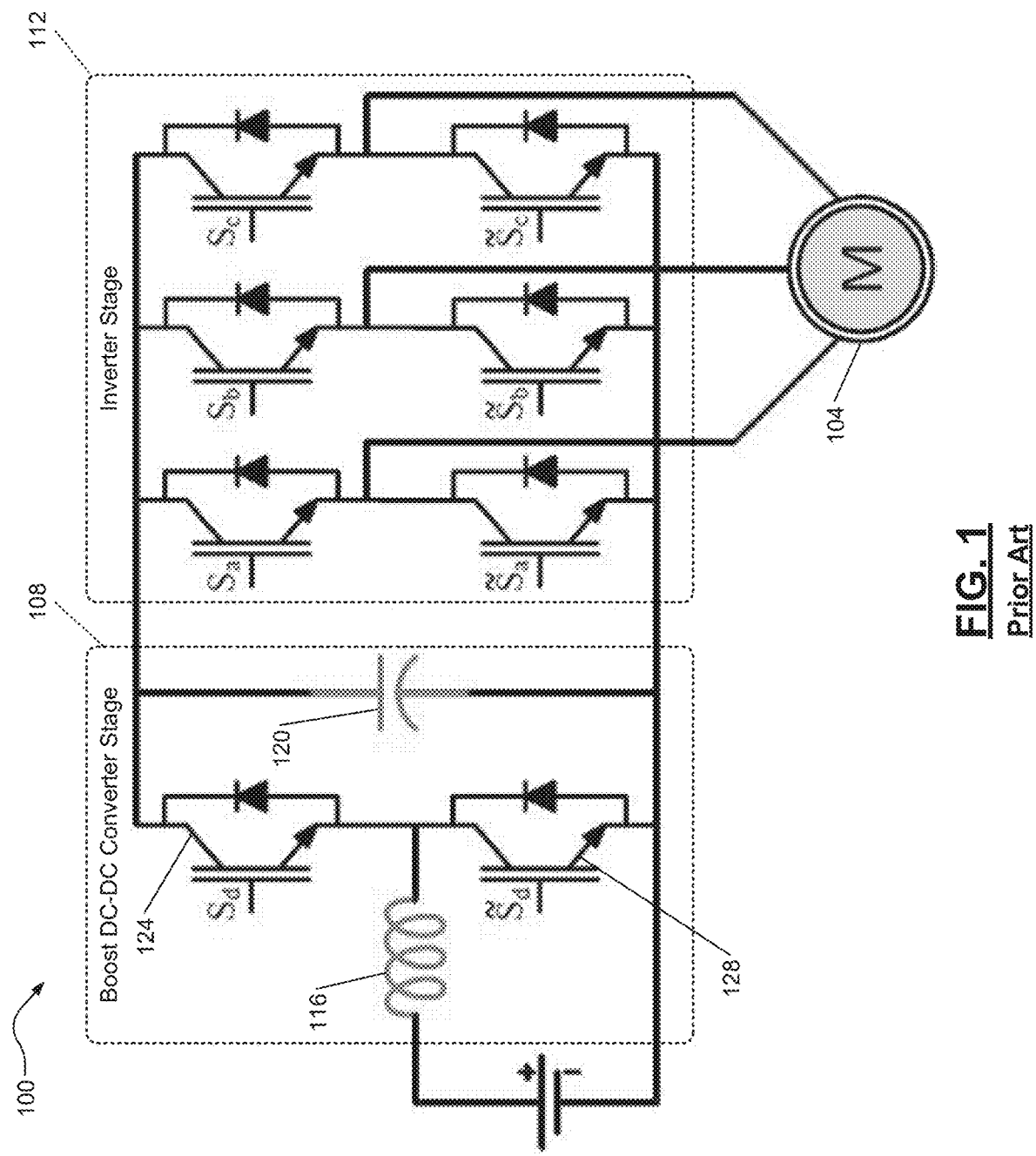
FIG. 1 is an example circuit topology of conventional inverter-converter topology in the prior art.

Referring again to FIG. 1, an example circuit topology of conventional inverter-converter 100 topology in the prior art is shown. The conventional inverter-converter 100 provides voltage to a motor 104. The conventional inverter-converter 100 includes a boost DC-DC converter stage 108 and an inverter stage 112. The boost DC-DC converter stage 108 includes an inductor 116 and a capacitor 120 and a pair of switches. The capacitor is connected in parallel the pair of switches, such as a first switch 124 and a second switch 128, as well as pairs of switches in the inverter stage 112.

Figure 2:
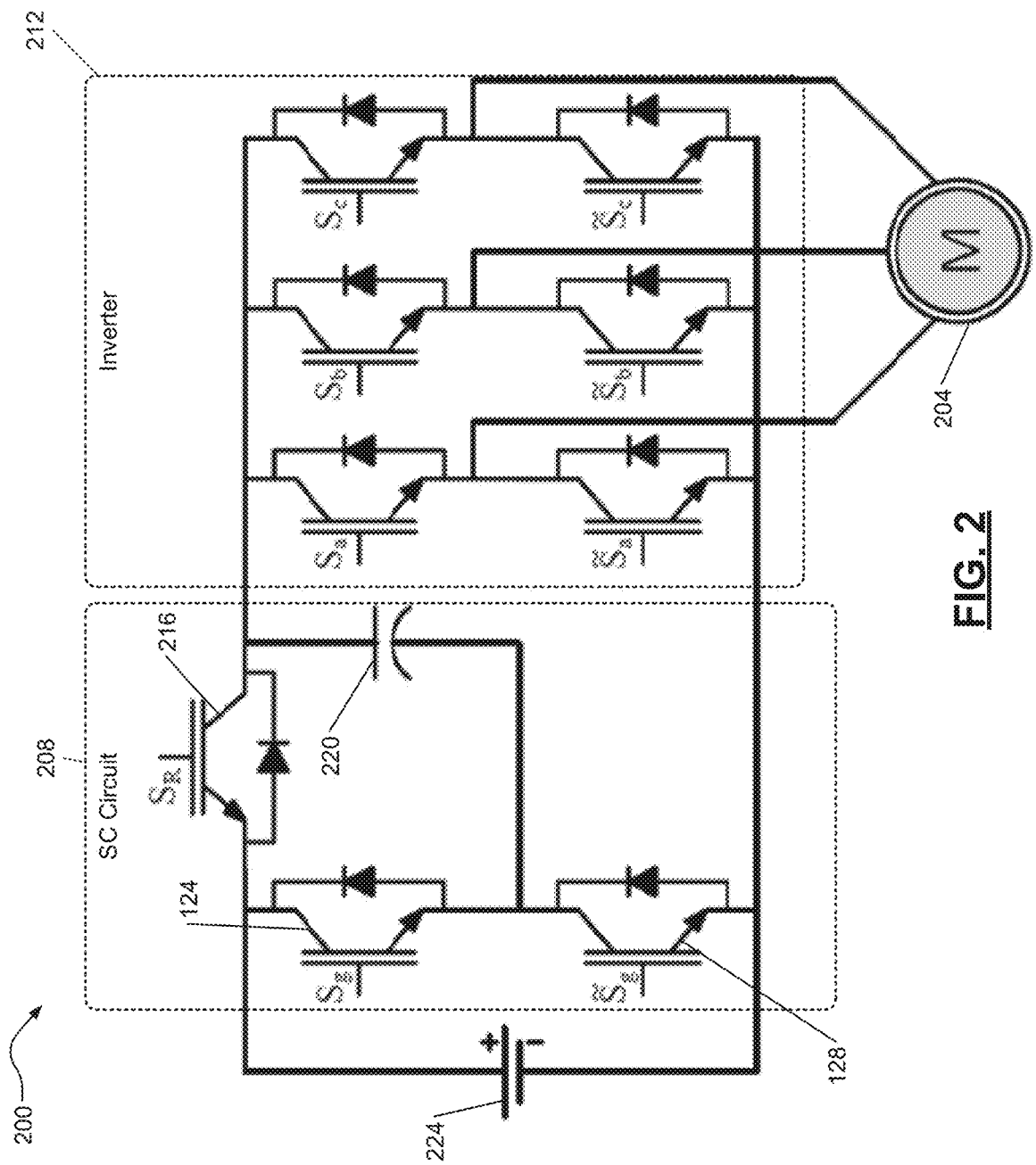
FIG. 2 is an example circuit topology of a switch capacitor converter according to the principles of the present disclosure.

Referring now to FIG. 2, an example circuit topology of a SC converter 200 according to the principles of the present disclosure is shown. The SC converter 200 concept can be applied to all DC-AC, AC-DC, AC-AC, and DC-DC power conversion. In example implementations, FIG. 2 depicts the SC converter 200 topology for DC-AC power conversion for machine drive—for example, driving a motor 204.

The SC converter 200 employs a SC circuit 208 with an inverter 212 or switching arrangement to form a unified circuit. The SC circuit 208 is used to create a discrete value of the voltage. Therefore, the proposed SC circuit 208 differs from the conventional one by not having the reverse blocking diode at the load side and a large filtering capacitor. Additionally, the SC circuit 208 removes the inductor 116 of FIG. 1 and instead utilizes a switch capacitor technique. Eliminating the inductor reduces the overall weight of the SC circuit 208, resulting in the ability to obtain a higher power density. Additionally, a higher level of voltage can be obtained when using multiple switch capacitor circuits. The SC circuit 208 design is controlled by limiting the charging current, for example, by adjusting a size of the SCs, adjusting a switching frequency, and including limiting resistors in the capacitor charging path.

Figure 3:
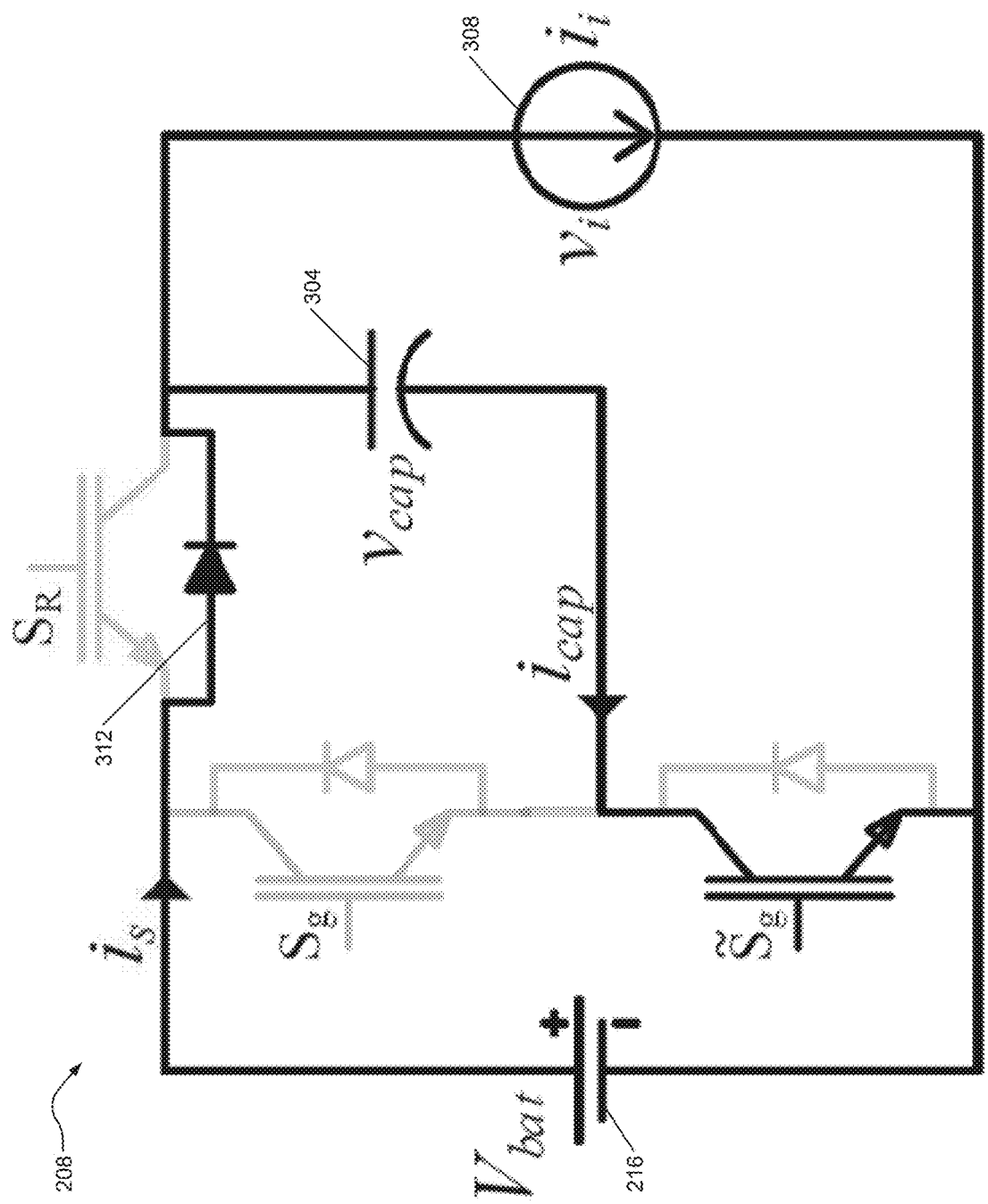
FIG. 3 is an example circuit topology of the switch capacitor converter of FIG. 2 in a charging state.
Figure 4:
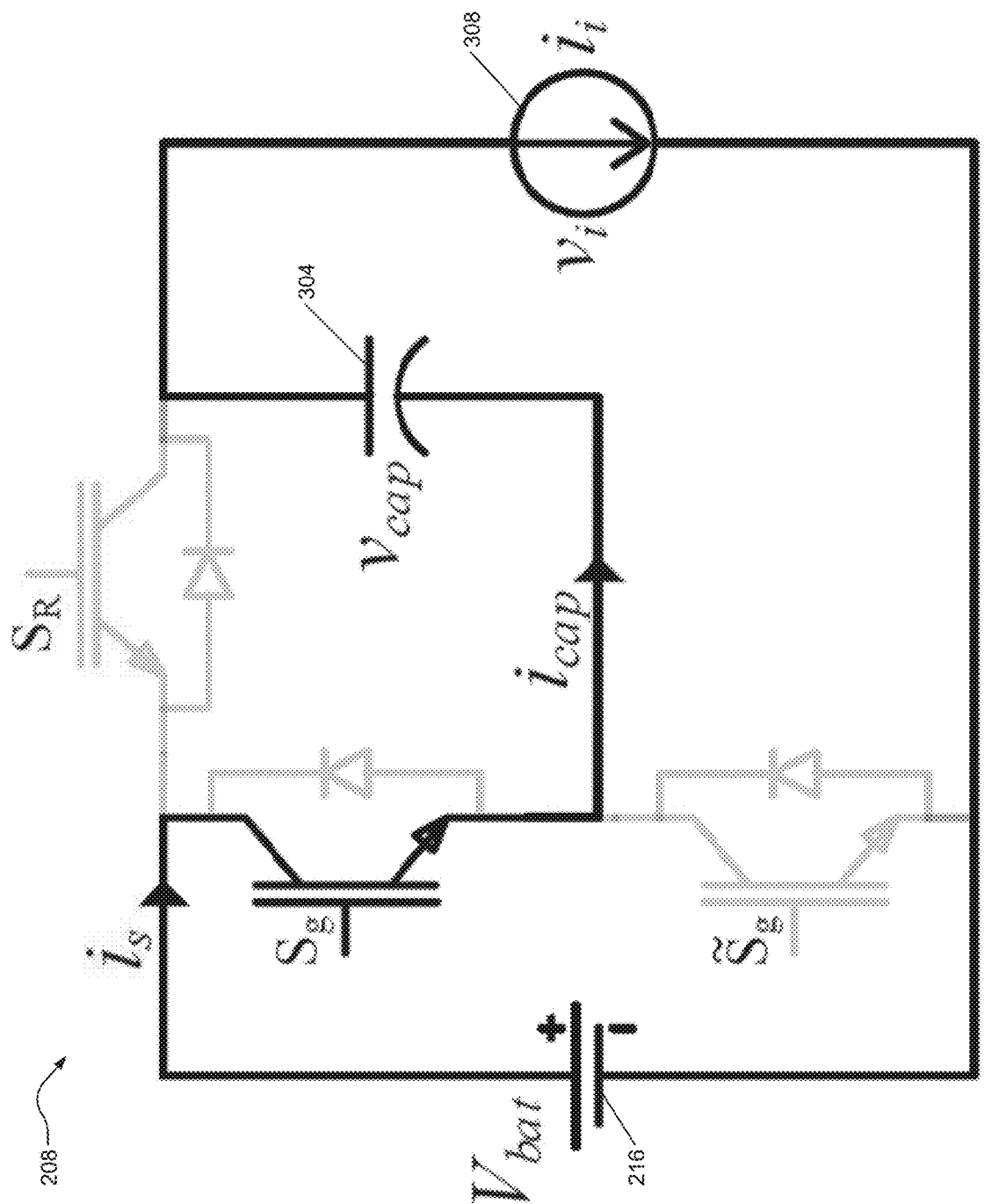
FIG. 4 is an example circuit topology of the switch capacitor converter of FIG. 2 in a discharging state.

In FIG. 2, a new SC 216 is included and a capacitor 220 is connected to an end of the new SC 216 and now between the first switch 124 and the second switch 128. A source 224 supplies voltage to the SC circuit 208. The SC circuit 208 can have two possible states: a discharging state and a charging state. FIG. 3 depicts a first state when a capacitor 304 is charging. When charging, the capacitor 304 is in a parallel configuration with a load 308. FIG. 4 depicts a second state when the capacitor 304 is discharging. When discharging, the capacitor 304 is in a series configuration with the load 308. Switching between the first state and the second state can provide two times the voltage to the load 308.

With respect to FIG. 3, the voltage of the battery, $V_{bat}$, can be expressed as follows in Equation 1:

$$V_{bat}=v_{cap}=v_i \qquad (1)$$

The current, $i_i$, through the load 308 in FIG. 3, such as a motor of a hybrid vehicle, can be expressed as follows in Equation 2:

$$i_i=S_a i_a+S_b i_b+S_c i_c \qquad (2)$$

With respect to FIG. 4, the voltage of the battery, $V_{bat}$, can be expressed as follows in Equation 3:

$$V_{bat}=v_{cap};\ v_i=2V_{bat} \qquad (3)$$

The current, $i_i$, through the load 308 in FIG. 4, such as a motor of a hybrid vehicle, can be expressed as follows in Equation 4:

$$i_i=S_a i_a+S_b i_b+S_c i_c \qquad (4)$$

Figure 5A:
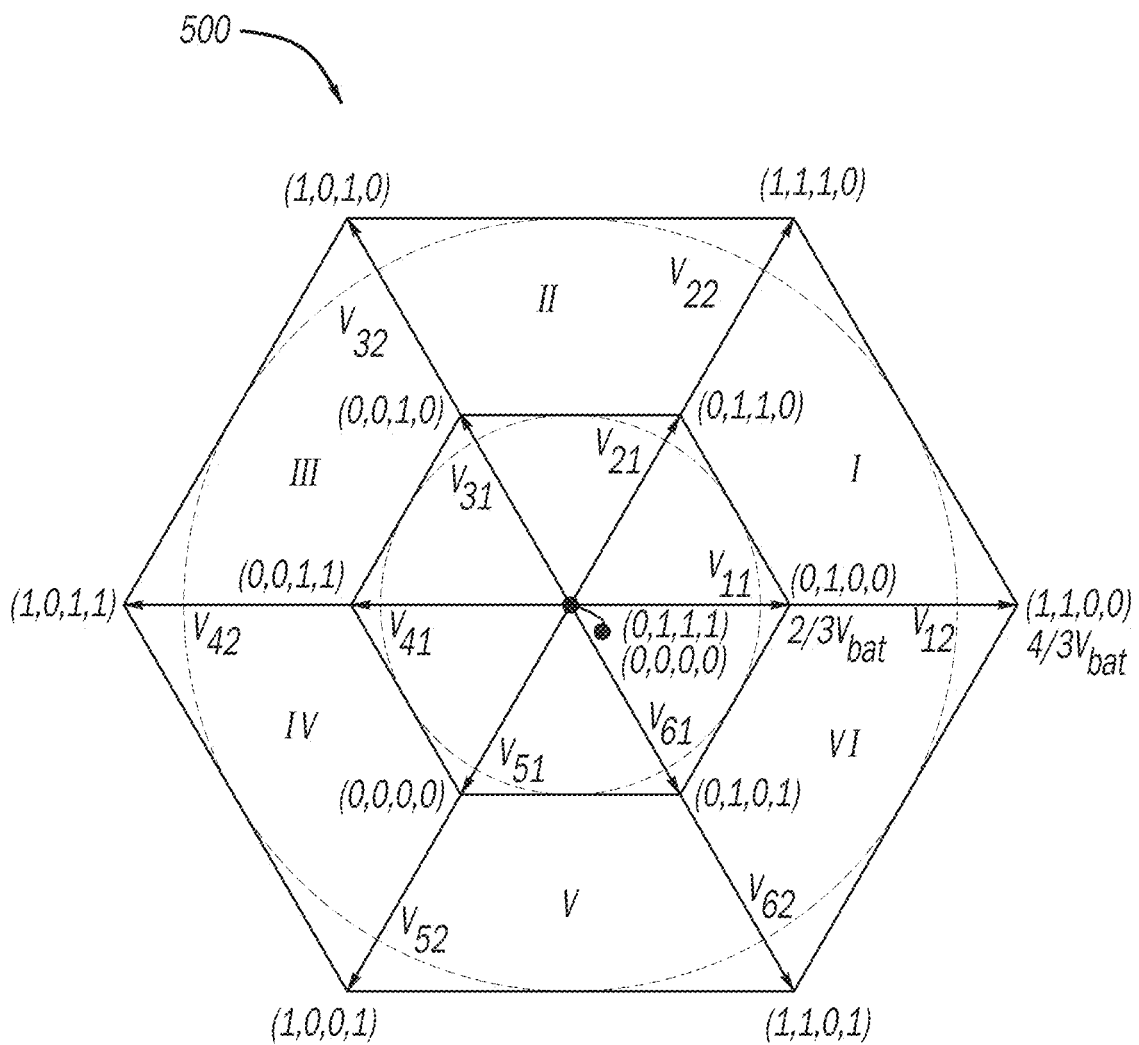
FIG. 5A is an example space vector hexagon.
Figure 5B:
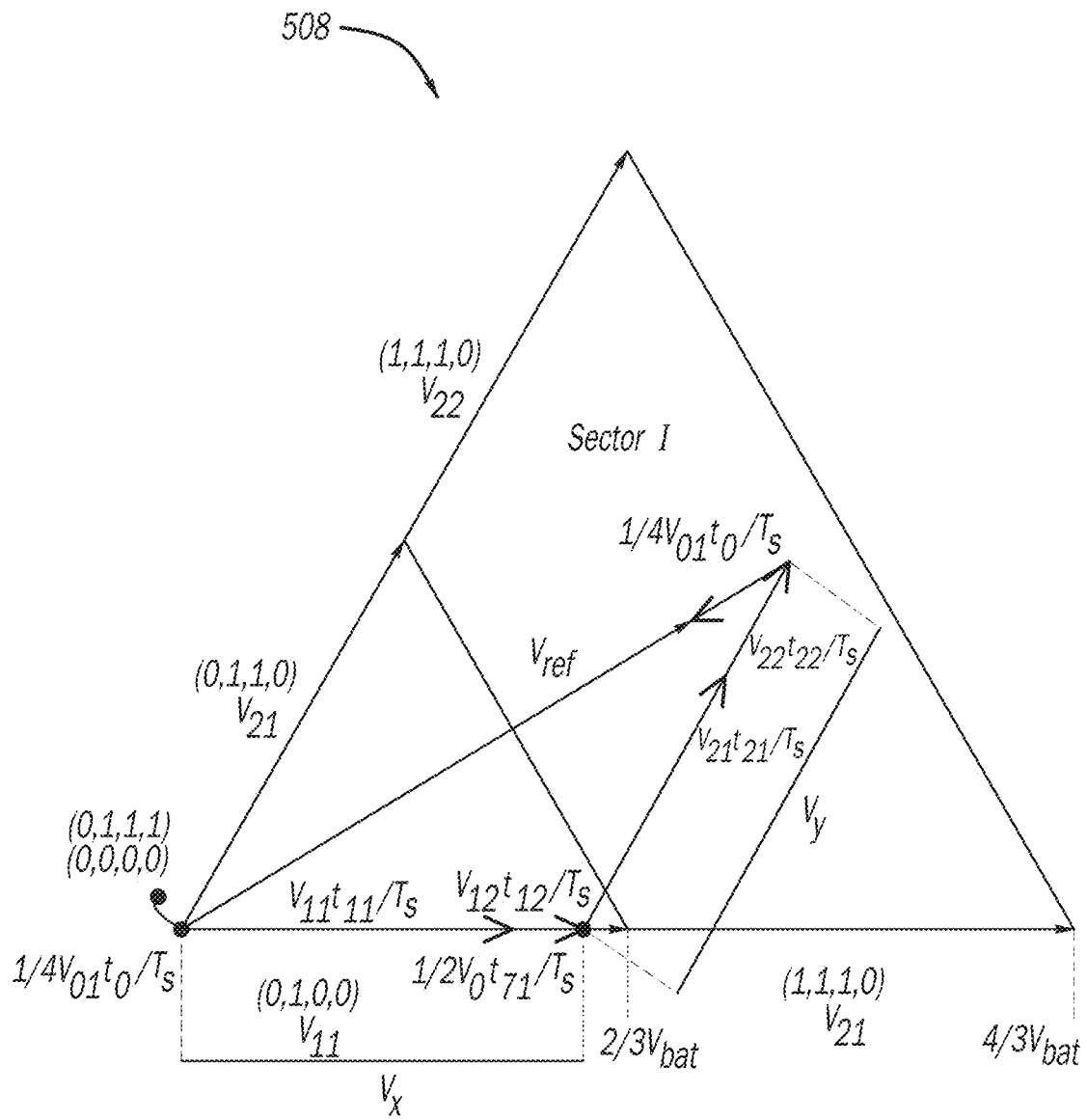
FIG. 5B is an example of reference vector synthesis in sector I of the space vector hexagon of FIG. 5A.

In addition to these options, the other phase legs still feature the eight known inverter states. The overall feasible states in the SC converter 200 are fourteen. FIG. 5A depicts the fourteen states in a space vector hexagon 500. Notably, the states of the SC converter resemble a three-level inverter with phase voltage possibilities $\{0; V_{bat}; 2V_{bat}\}$. FIG. 5B is an example of reference vector synthesis in sector I of the space vector hexagon of FIG. 5A.

To derive a dwell time from each vector, a few assumption are made. For example, in each sector, the four adjacent active vectors and the zero vectors are used to synthesis the reference voltage vector. During the discharge state (FIG. 3), the capacitor voltage is assumed constant and equal to the battery voltage. Therefore, the dwell time during the discharge state needs to be minimized to allow for a minimum voltage drop during the capacitor discharge.

Assume that the reference voltage vector $V_{ref}$ can be synthesis using the following virtual vectors:

$$V_{ref}T_s=V_x t_x+V_y t_y+V_0 t_0 \qquad (5)$$

where, $$V_x t_x=V_{11}t_{11}+V_{12}t_{12} \qquad (6)$$

$$V_y t_y=V_{21}t_{21}+V_{22}t_{22} \qquad (7)$$

With some algebraic manipulation, the dwell time for the four active vectors is depicted in the following equations:

$$t_{11}=(1-A)t_x \qquad (8)$$

$$t_{12}=At_x \qquad (9)$$

where, $$t_x = \sqrt{3}\,T_s * M_i * \sin\!\left(\frac{\pi}{3}-\theta\right) \qquad (10)$$

and $$A = \begin{cases} 0, & 0 \le M_i \le \dfrac{1}{\sqrt{3}} \\ \sqrt{3}\,M_i - 1, & \dfrac{1}{\sqrt{3}} < M_i \le \dfrac{2}{\sqrt{3}} \end{cases} \qquad (11)$$

$$t_{21} = (1-A)t_y \qquad (12)$$

$$t_{22} = At_y \qquad (13)$$

where, $$t_y=\sqrt{3}T_s*M_i*\sin(\theta) \qquad (14)$$

Further, the modulation index ($M_i$) is defined as follows: $M_i=|V_{ref}|/V_{bat}$. The factor $A\in[0,1]$ is the boost factor.

Therefore, when $$0 \le M_i \le \frac{1}{\sqrt{3}},\quad t_{11}=t_x$$

and $t_{12}=0$, $t_{21}=t_y$ and $t_{22}=0$. The capacitor is maintained in parallel with the DC source and no discharge occurs during anytime. The SC converter operation in this case is typical to the operation of a two-level inverter, which is referred to as (Abstemious Mode). On the other hand, when $$\frac{1}{\sqrt{3}} < M_i \le \frac{2}{\sqrt{3}},\quad 0 < A \le 1,$$

and the capacitor is charged and discharged with a rate proportional to the value of A, the operation mode is referred to as (Gluttonous Mode). When $$M_i = \frac{2}{\sqrt{3}},\ t_{11}=0,\ t_{12}=t_y,\ t_{21}=0,$$

and $t_{22}=t_y$. In this case, the capacitors are only charging during zero vector implementation. Therefore, the six step operation cannot be performed in the gluttonous mode and the minimum vector requirement must be met to maintain the capacitor charge level.

As mentioned above, to prevent the SC switches from being destroyed, the SC circuit 208 is analyzed and designed according to certain current limitations. That is, since switch capacitors are routinely used in low voltage applications, using switch capacitors in the presently claimed invention presents a unique challenge of preventing the destruction of circuit components, such as the SCs, due to a high current travelling through the SC circuit 208 in a charging state (FIG. 3) after the capacitor has been discharged, resulting in a voltage drop, during the discharging state (FIG. 4).

In a pre-discharge state shown in FIG. 3, the capacitor 304 is charged with voltage equal to:

$$V_{cap} = V_{bat} - (V_D + V_p) = V_{dc} \quad (15)$$

where $V_D$ is the forward voltage drop across a diode 312 and, for simplification, $V_p$ refers to the summation of the parasitic voltages drop along the charging path, including the voltage drop across the series resistance of the capacitor 304 and the series resistance of the switch.

Then, the capacitor 304 is discharged to the load 308 as shown in FIG. 4. During this time the capacitor 304 is connected in series with the source 224 and the load 308; therefore:

$$i_l = i_s = i_{cap} = S_a i_a + S_b i_b + S_c i_c \quad (16)$$

To estimate the charging current of the capacitor, the sequence in which the capacitor is charged and discharged with respect to the inverter states is considered. In an example where the capacitor is discharged in two separate intervals per sampling time $T_s$, the first interval may produce $V_{12}$ and $V_{22}$ and the second interval produces $V_{22}$ and $V_{12}$. First, assume that Equation 15 holds, and therefore, before every discharge state, $v_{cap1} = V_{dc}$. The capacitor voltage at point 2 $v_{cap2}$ can be predicted as follows:

$$v_{cap2} = V_{dc} - \frac{i_a t_{12}}{2C} \quad (17)$$

Similarly, the capacitor voltage at point 3 $v_{cap3}$ can be expressed as:

$$v_{cap3} = V_{dc} - \frac{i_a A t_x}{2C} + \frac{i_c A t_y}{2C} \quad (18)$$

Note that:

$$i_a = I_a \cos(\theta - \phi) \quad (19)$$

$$i_b = I_b \cos\left(\theta - \phi + \frac{2\pi}{3}\right)$$

$$i_c = I_c \cos\left(\theta - \phi - \frac{2\pi}{3}\right)$$

where $i_a$, $i_b$, and $i_c$ are phase shifted from the reference voltage by $\phi$, which is the power factor angle. $I_a = I_b = I_c = I$ are the phase currents amplitudes. Note that $t_x$ and $t_y$ are functions of the modulation index $M_i$ and the angle $\theta$ as expressed in Equations 10 and 14, respectively.

For any assigned value of the modulation index, the capacitor voltage drop in the first discharge interval would be expressed as:

$$\Delta V = V_{dc} - v_{cap3} = \frac{A}{2C}(t_x i_a - t_y i_c) \quad (20)$$

and the maximum value of $\Delta V$ ($\Delta V_{max}$) can be obtained be taking the gradient of Equation 20 with respect to $\theta$, $$\frac{\partial \Delta V}{\partial \theta} = \frac{\sqrt{3} M_i T_s I}{C}\left(\cos\left(2\theta - \phi - \frac{\pi}{3}\right) + \cos\left(2\theta - \phi - \frac{2\pi}{3}\right)\right) \quad (21)$$

Note that there exists an angle $$\hat{\theta} \in \left\{0, \frac{\pi}{3}\right\}$$

that causes maximum $\Delta V$ and makes the gradient equal zero:

$$\frac{\partial \Delta V}{\partial \theta} = 0 = \left(\cos\left(2\hat{\theta} - \phi - \frac{\pi}{3}\right) + \cos\left(2\hat{\theta} - \phi - \frac{2\pi}{3}\right)\right) \quad (22)$$

By using the following identity:
$$\cos(x-y) + \cos(x+y) = 1\ \cos(x)\cos(y) \quad (23)$$

Equation 22 can be expressed as:

$$\cos\left(2\hat{\theta} - \phi - \frac{\pi}{2} + \frac{\pi}{6}\right) + \cos\left(2\hat{\theta} - \phi - \frac{\pi}{2} - \frac{\pi}{6}\right) = \quad (24)$$
$$2\cos\left(2\hat{\theta} - \phi - \frac{\pi}{2}\right)\cos\left(\frac{\pi}{6}\right)$$

Obviously, $$\cos\left(\frac{\pi}{6}\right) \neq 0;$$

therefore, $$\cos\left(2\hat{\theta} - \phi - \frac{\pi}{2}\right) = 0,$$

leading to the following conditions:

$$2\hat{\theta} - \phi - \frac{\pi}{2} = \frac{\pi}{2}\ 2\hat{\theta} - \phi - \frac{\pi}{2} = -\frac{\pi}{2} \quad (25)$$

and $\theta$ that causes maximum $\Delta V$ is one of the two solutions:

$$\hat{\theta} = \begin{cases} \frac{\pi + \phi}{2}, & 0 > \phi \geq -\frac{\pi}{2} \\ \frac{\phi}{2}, & 0 \leq \phi \leq \frac{\pi}{2} \end{cases} \quad (26)$$

The formulation of the angle $\hat{\theta}$ gives the insight that for any power factor PF from 0 to 1, the angle that causes maximum ΔV always lies between 0 degrees and 45 degrees of sector I. The maximum voltage drop can be expressed as:

$$\Delta V\Big|_{\theta=\frac{\phi}{2}} = \Delta V_{max} = \frac{A}{2C}(t_x i_a - t_y i_c) = \quad (27)$$

$$\frac{A}{2C}\sqrt{3}\,M_i T_s I\left[\sin\!\left(\frac{\pi}{3}-\frac{\phi}{2}\right)\cos\!\left(\frac{\phi}{2}\right) - \sin\!\left(\frac{\phi}{2}\right)\cos\!\left(\frac{\phi}{2}-\phi-\frac{2\pi}{3}\right)\right]$$

Figure 6:
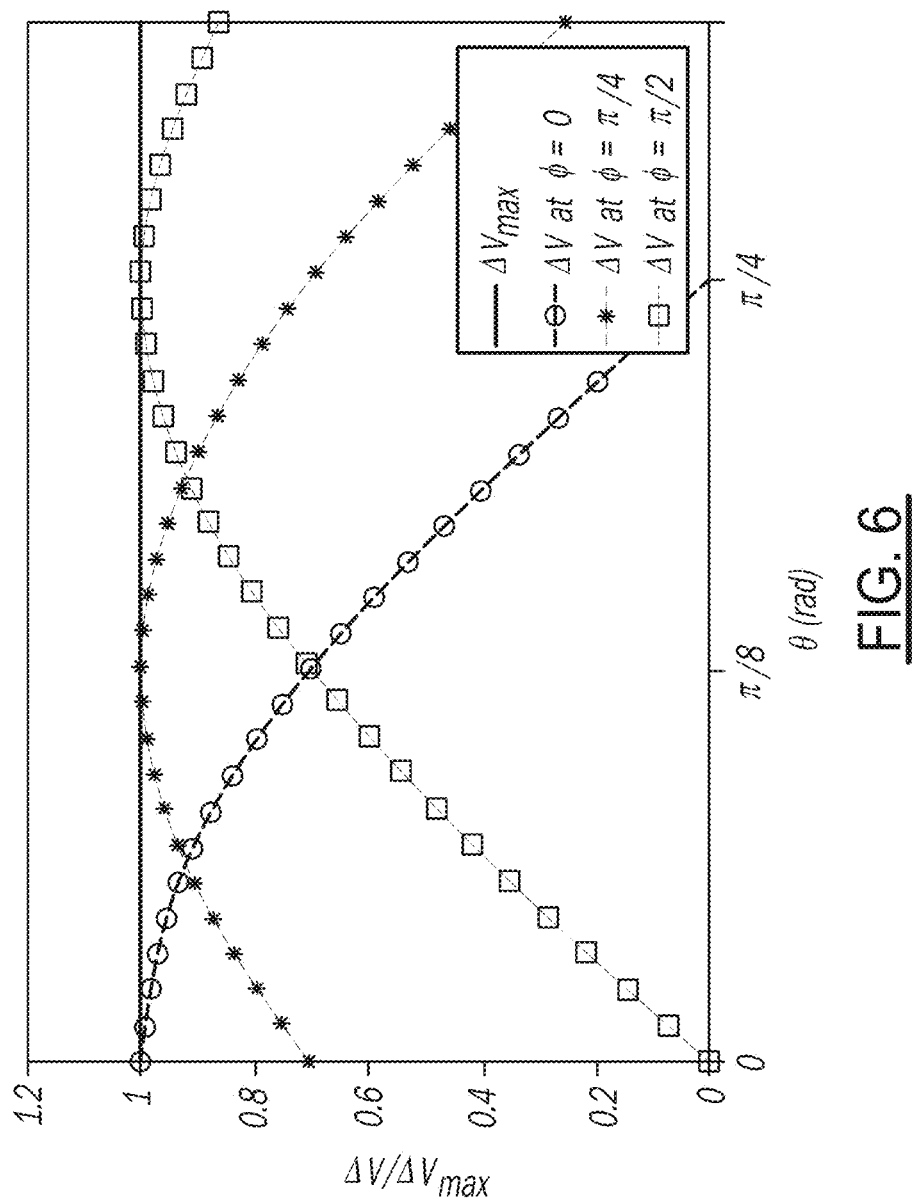
FIG. 6 is a graph depicting the relationship between a maximum voltage and a power factor angle of an example circuit.
Figure 7A:
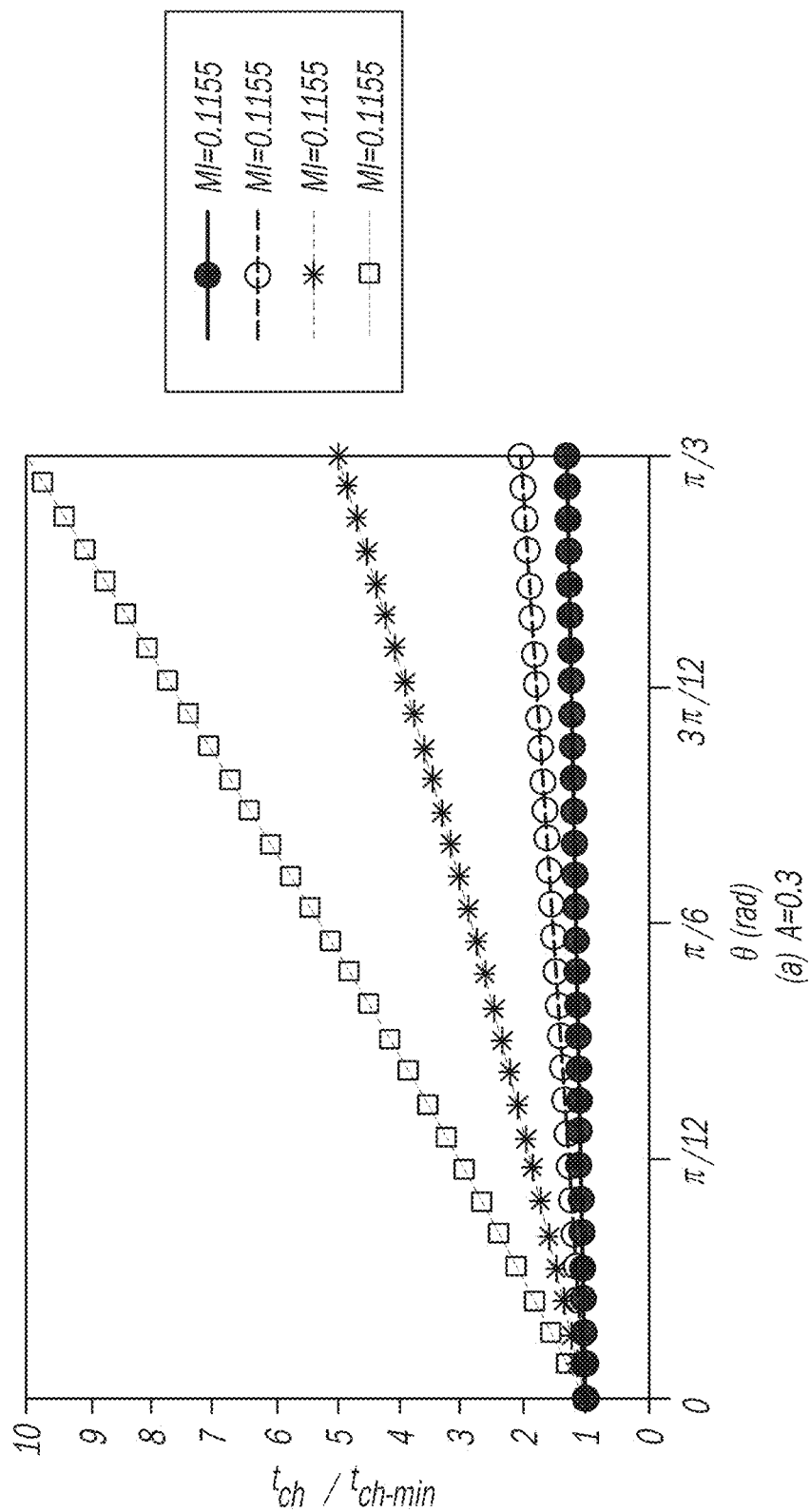
Figure 7B:
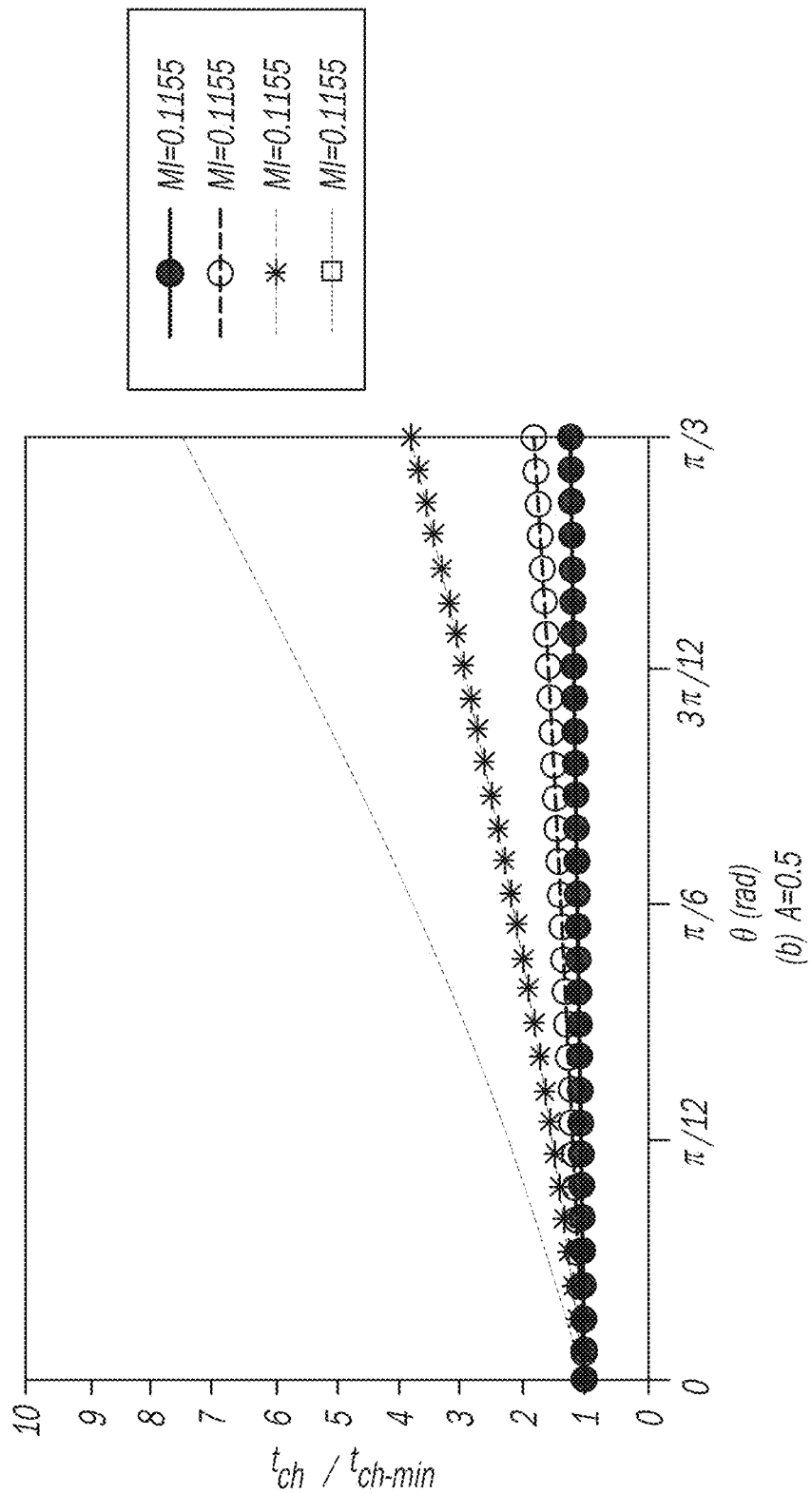
Figure 7D:
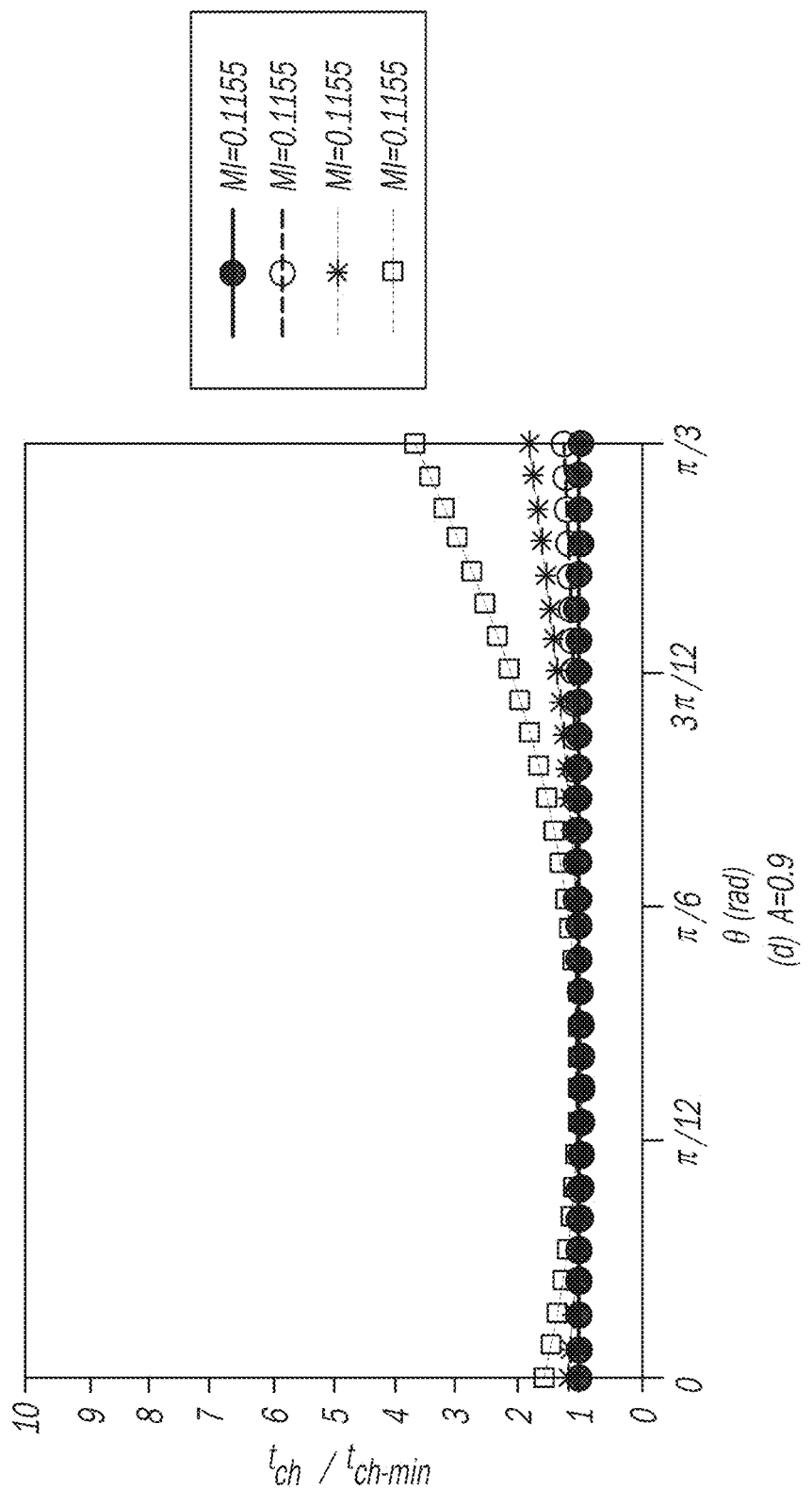

So far it has been shown that the maximum voltage drop location within the sector is solely dependent on the power factor PF of the load. Referring to FIG. 6, a graph depicting the relationship between $\Delta V_{max}$ and a power factor angle of an example circuit is shown. However, as can be gathered from FIG. 6, the power factor PF does not affect the value of the maximum voltage drop $\Delta V_{max}$ and all of the terms that include φ in Equation 27 are equal to $$\frac{\sqrt{3}}{2}.$$

Therefore:

$$\Delta V_{max} = \frac{3AM_i I}{4Cf_{sw}} \quad (28)$$

To complete the analysis, the capacitor must reach $\approx V_{dc}$ voltage during the charging time. This can be understood by obtaining the minimum charging time location within the sector and its value dependency. The charging time $t_{ch}$ is a function of $M_i$ and A:

$$t_{ch} = \frac{t_0}{2} + (1-A)t_y = \frac{T_s}{2} - \sqrt{3}\,T_s M_i\left[\frac{1}{2}\sin\!\left(\frac{\pi}{3}-\theta\right) - \left(\frac{1}{2}-A\right)\sin(\theta)\right] \quad (29)$$

Taking the gradient for Equation 29 and equating it to zero results in the angle $\hat{\theta}$ at which the minimum charging time is experienced $t_{ch-min}$:

$$\frac{\partial t_{ch}}{\partial \theta} = 0 = \left(\cos\!\left(\frac{\pi}{3}-\hat{\theta}\right)\right) - \left(A - \frac{1}{2}\right)\cos(\hat{\theta}) \quad (30)$$

The optimal angle is determined to be $$\hat{\theta} = \tan^{-1}\!\left(\frac{4A-3}{\sqrt{3}}\right) \quad (31)$$

Note that the angle $\hat{\theta}$ lies in sector I only when ¾≤A≤1. When 0≤A<¾, the resulting angle is negative, and it does not reside in sector I. However, a small segment of a sinusoidal function has a linear behavior. It is observed that $\hat{\theta}=0$ when 0≤A<¾. Therefore, the general description for $\hat{\theta}$ is:

$$\hat{\theta} = \begin{cases} 0, & 0 \le A < \frac{3}{4} \\ \tan^{-1}\!\left(\frac{4A-3}{\sqrt{3}}\right), & \frac{3}{4} \le A \le 1 \end{cases} \quad (32)$$

As a result, the minimum charging time $t_{ch-min}$ is expressed as follows:

$$t_{ch-min} = \begin{cases} \frac{1}{2}T_s\!\left(1-\frac{3}{2}M_i\right), & 0 \le A < \frac{3}{4} \\ \left[\frac{1}{2}\sin\!\left(\frac{\pi}{3}-\tan^{-1}\!\left(\frac{4A-3}{\sqrt{3}}\right)\right)-\right. \\ \left.\left(\frac{1}{2}-A\right)\sin\!\left(\tan^{-1}\!\left(\frac{4A-3}{\sqrt{3}}\right)\right)\right], & \frac{3}{4} \le A \le 1 \end{cases} \quad (33)$$

Because of the symmetry of the sector, the other charging intervals have a similar expression for $t_{ch-min}$. In order for the capacitor to retain the full voltage after each charging period, the following condition must be met:

$$t_{ch-min} \ge RC\ln\!\left(\frac{V_{dc}-V_{cap}}{\frac{3}{4C}AT_s M_i I}\right) \quad (34)$$

Under these conditions, the maximum charging current amplitude passing through the diode of $S_R R$ and the IGBT of $\tilde{S}_g$ can be estimated as:

$$I_{charging-max} = \frac{3AM_i I}{4RCf_{sw}} \quad (35)$$

where R is the resistance along the charging path including the on-resistance of the switches and the ESR of the switched-capacitor. The power losses resulting from the additional resistance must be very small and can be estimated as follow:

$$P_{R-losses} = \frac{1}{R}\!\left(\frac{3AM_i I}{4Cf_{sw}}\right)^2 \quad (36)$$

The presented guidelines allow better understanding of the charging current and how the selection of the switching frequency, the capacitor size, $M_i$, and A will determine the current rating of the switched-capacitor half-bridge. Referring to FIGS. 7A-7D, graphs depicting a charging time with respect to a minimum charging time with varying boost factor (A) and modulation index ($M_i$) are shown. In other words, FIGS. 7A-7D show the normalized charging time in different values of $M_i$ and A. Note that the expressions of $\Delta V_{max}$ and $t_{ch-min}$ for the second $t_{ch}$ interval is the mirror image of the one shown in FIGS. 7A-7D.

Figure 8:
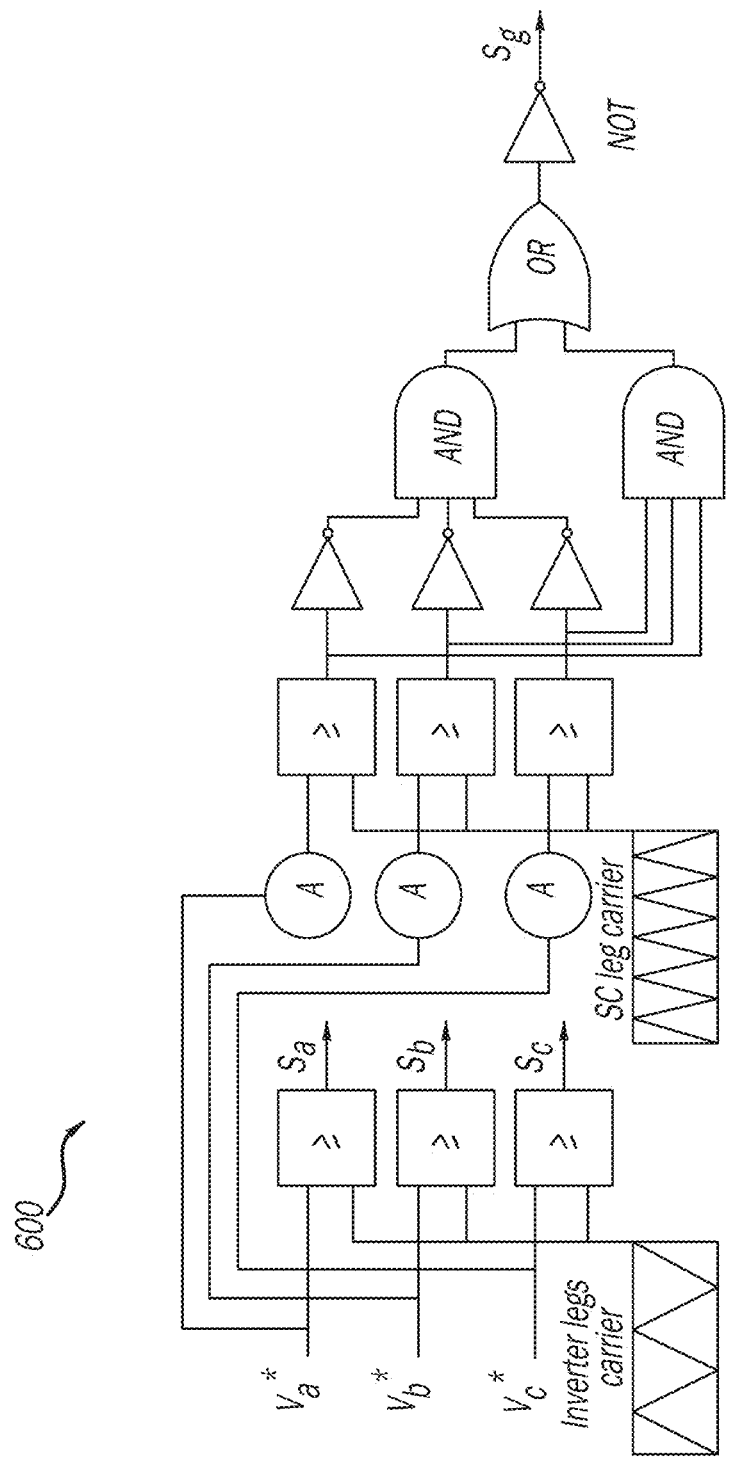
FIG. 8 is an example implementation of a carrier-based modulation with variable duty ratio of a switch capacitor converter according to the principles of the present disclosure.

Referring now to FIG. 8, an example implementation of a carrier-based modulation 600 with variable duty ratio of a switch capacitor converter according to the principles of the present disclosure is shown. The simplified carrier-based modulation 600 has the flexibility to minimize the discharging time $t_{dch}$ without causing additional switching losses. That is, the generation of the switching function for the SC converter can be further simplified by adopting the carrier-based modulation 600 method. More specifically, the carrier-based modulation 600 can reduce the charging current by adjusting the SCs switching frequency. This can be done by creating a separate high frequency carrier for creating the switching function ($S_g$), as shown in FIG. 8.

The constant A represent the depth in the gluttonous mode. The range of A is from zero to one. When A=0, the SC converter of FIG. 2 is operating in the abstemious mode. When A=1, the SC converter is fully gluttonous, and the SC charge is only at the zero vector implementation, which is very small. Because of this, the SC converter cannot operate in the over-modulation region when $$MI \geq \frac{2}{\sqrt{3}}.$$

The carrier frequency of the SC leg is much larger than the carrier frequency of the three inverter legs. The larger frequency allow $t_{dch}$ to be distributed along the long period of the inverter leg carrier, which causes the reduction of the charging current and the switch losses in the inverter. Furthermore, this allows the use of a SiC switch for the high frequency SC circuit and maintains the use of a Si switch for the low frequency inverter circuit.

Figure 9:
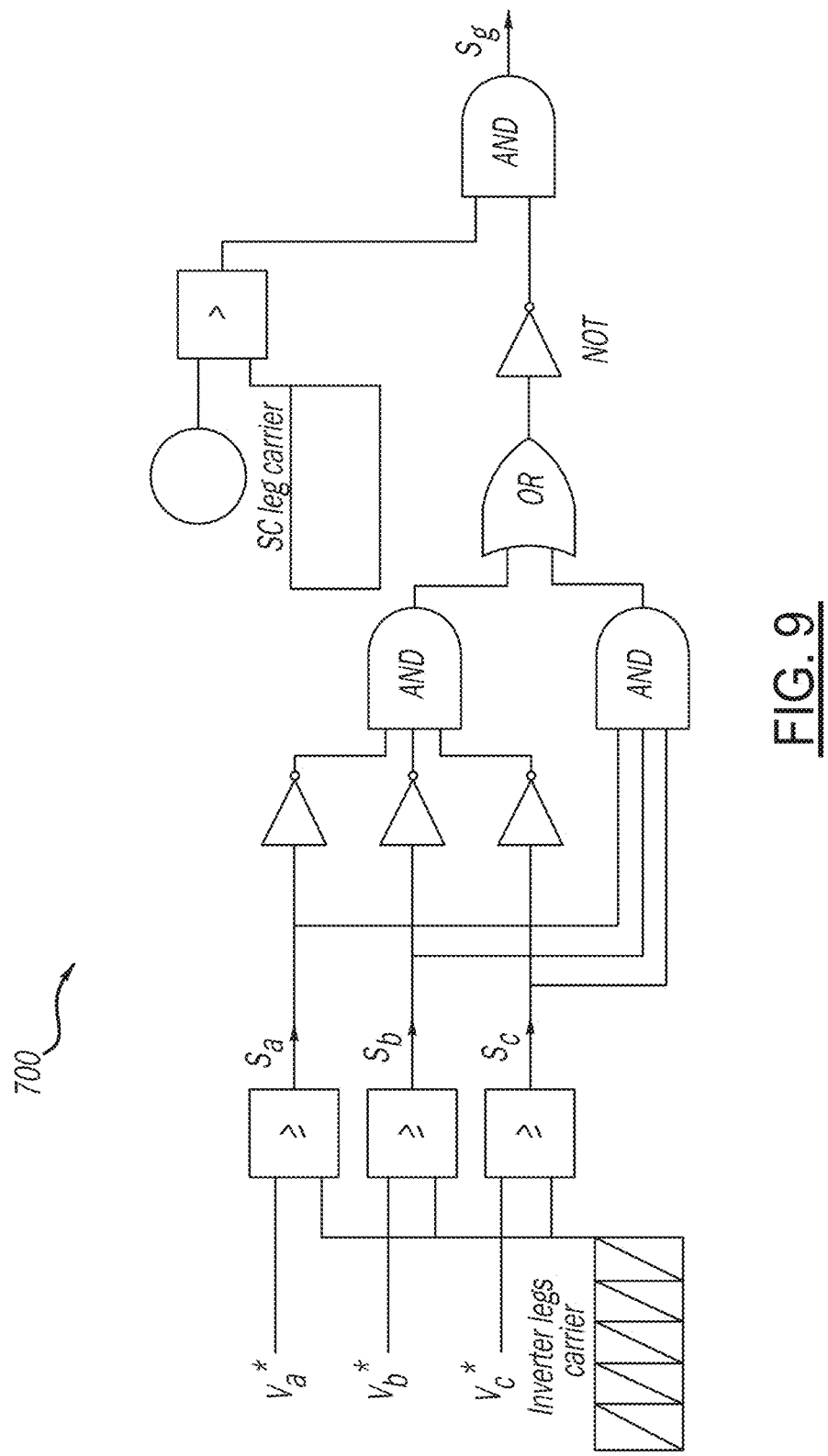
FIG. 9 is an example implementation of a carrier-based modulation with fixed duty ratio of a switch capacitor converter according to the principles of the present disclosure.
Figure 10:
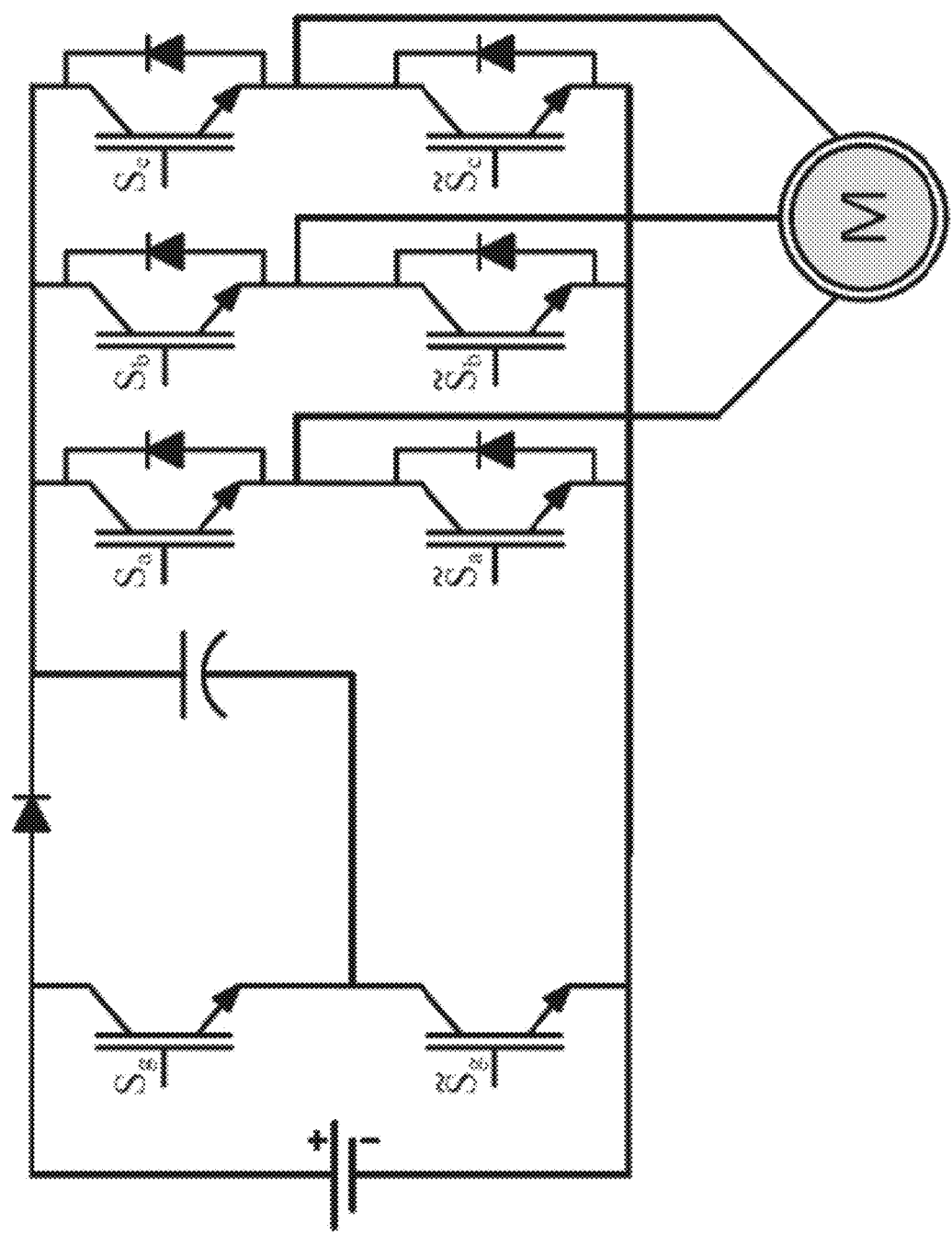
FIGS. 10-17 are alternative example circuit topologies of a switch capacitor converter.
Figure 11:
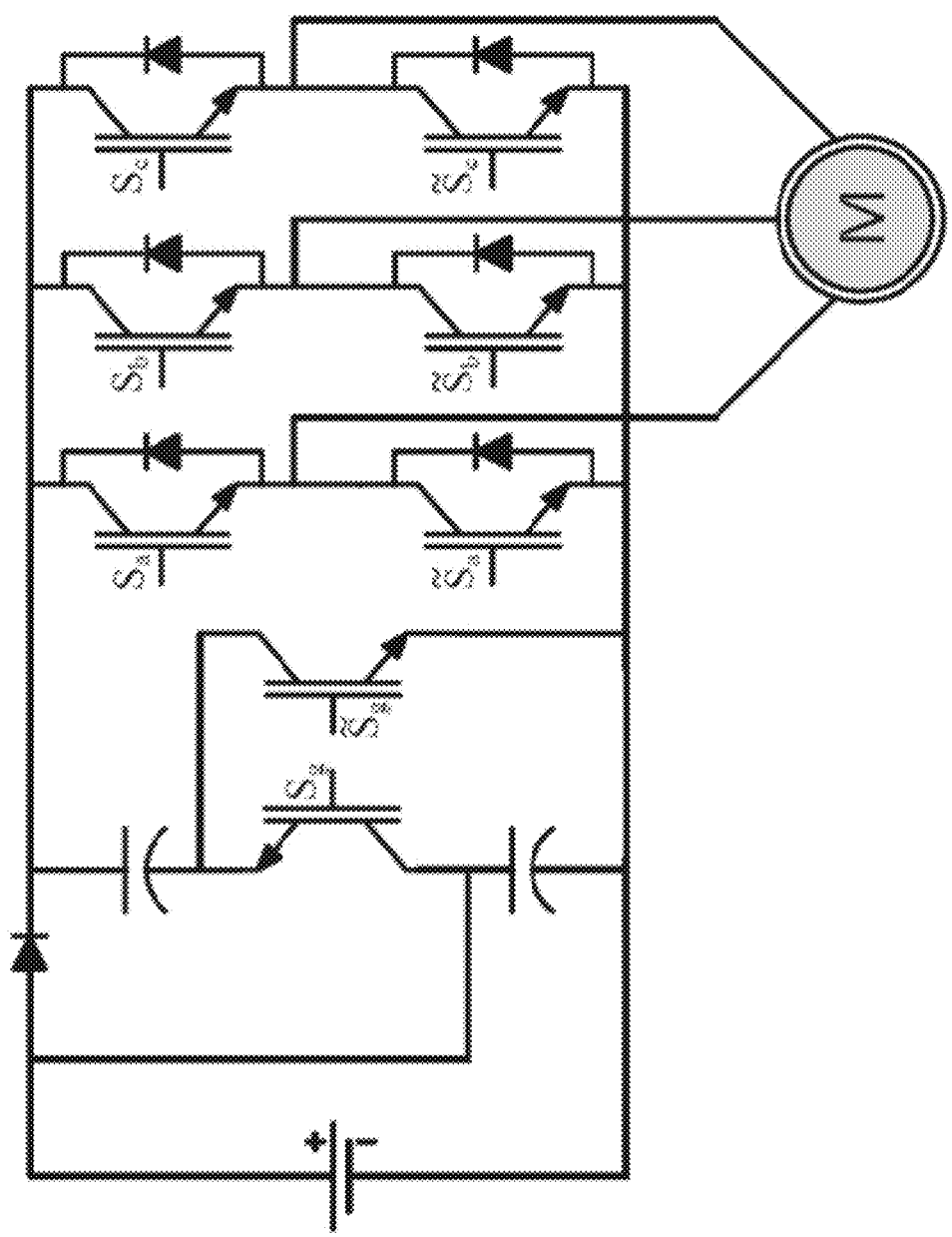
Figure 12:
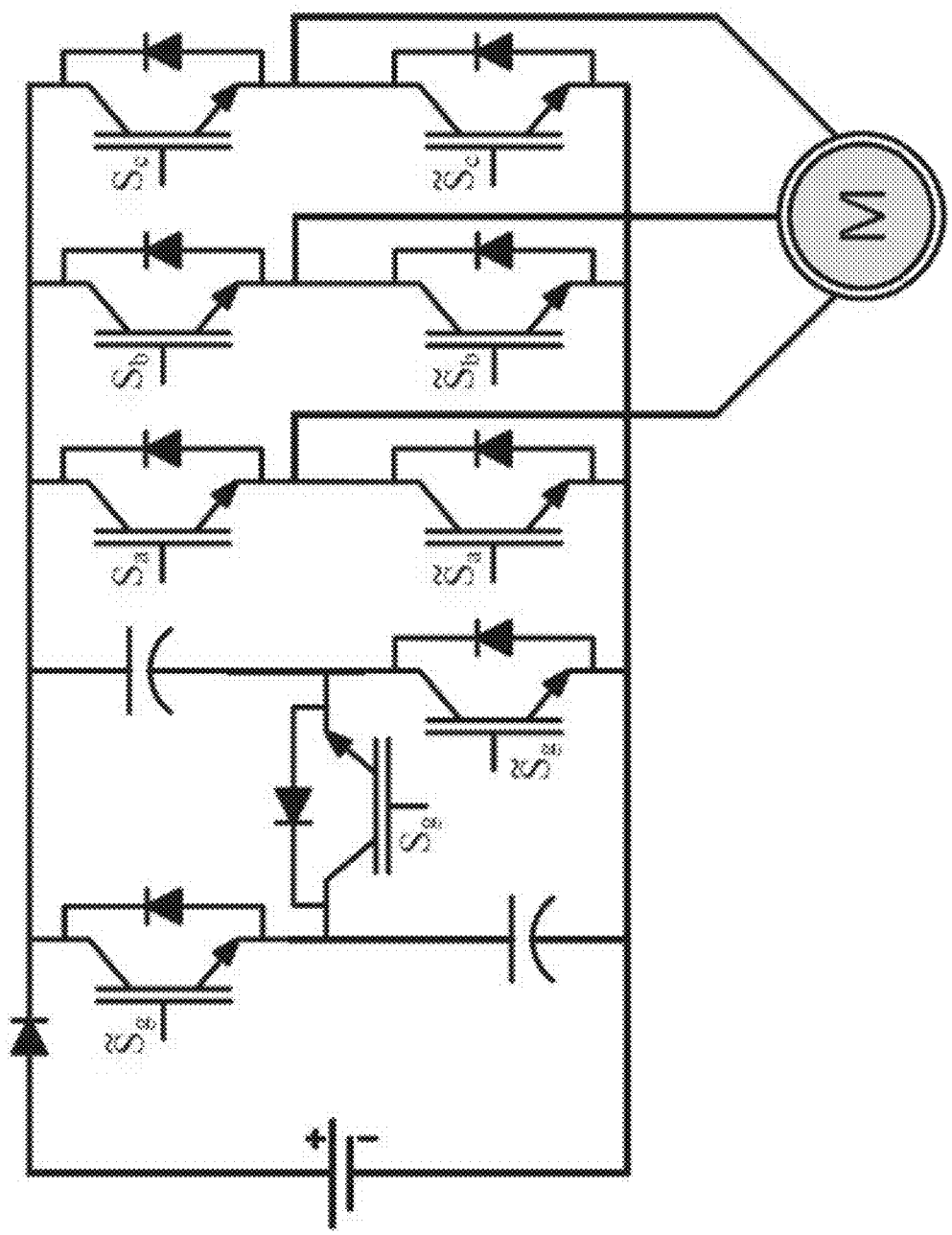
Figure 13:
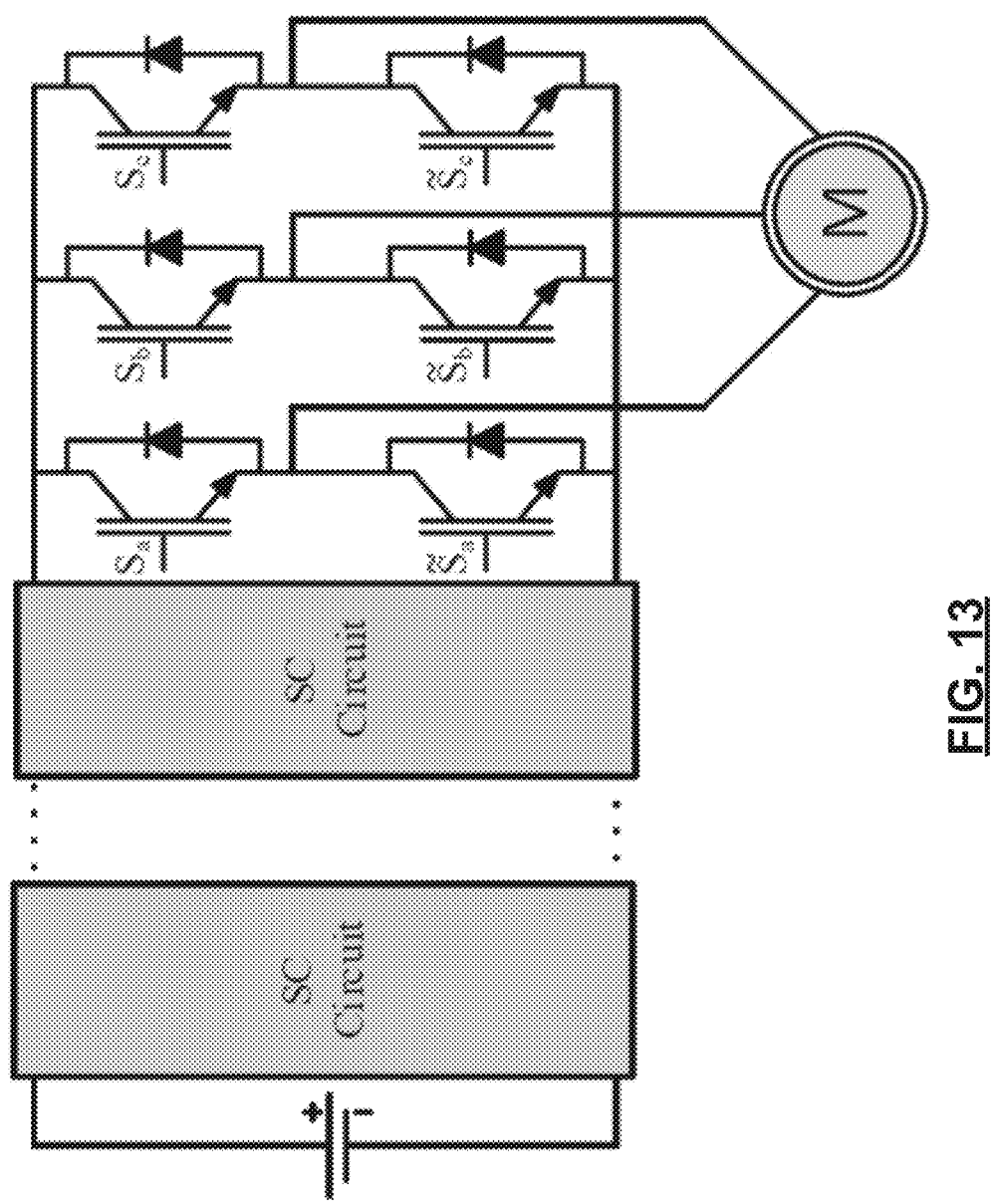
Figure 14:
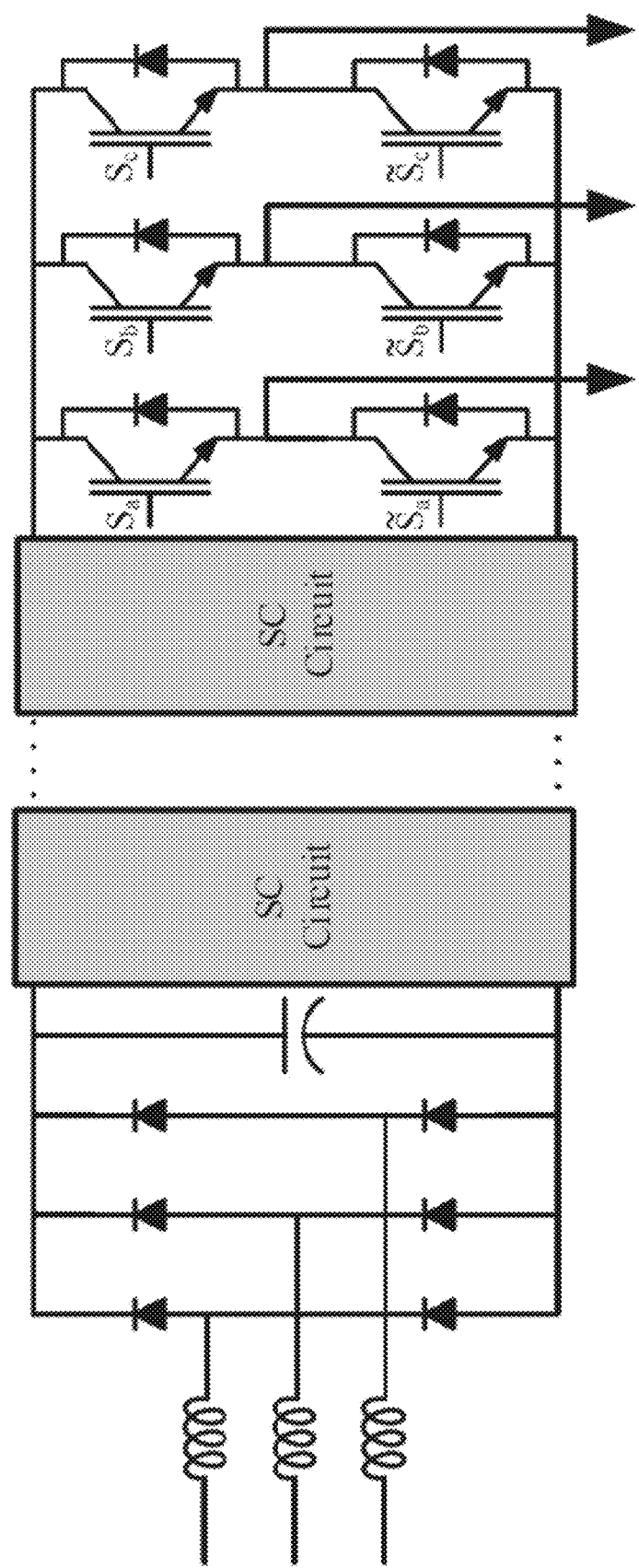
Figure 15:
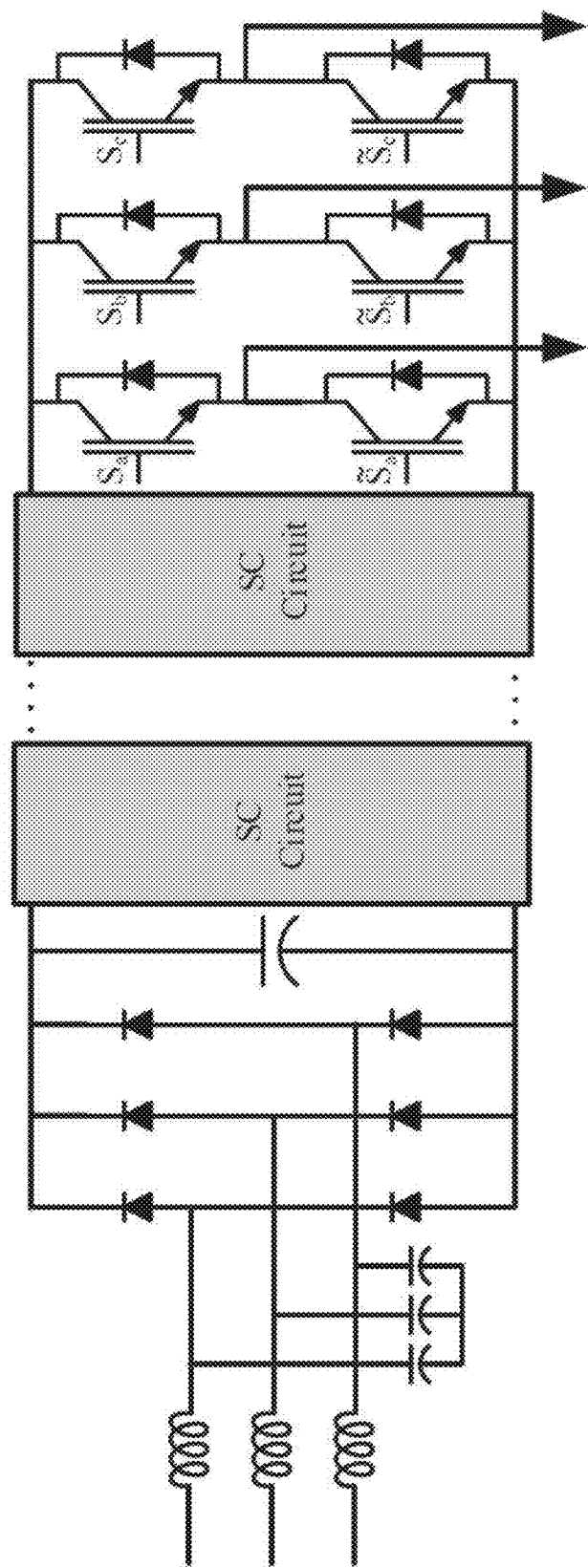
Figure 16:
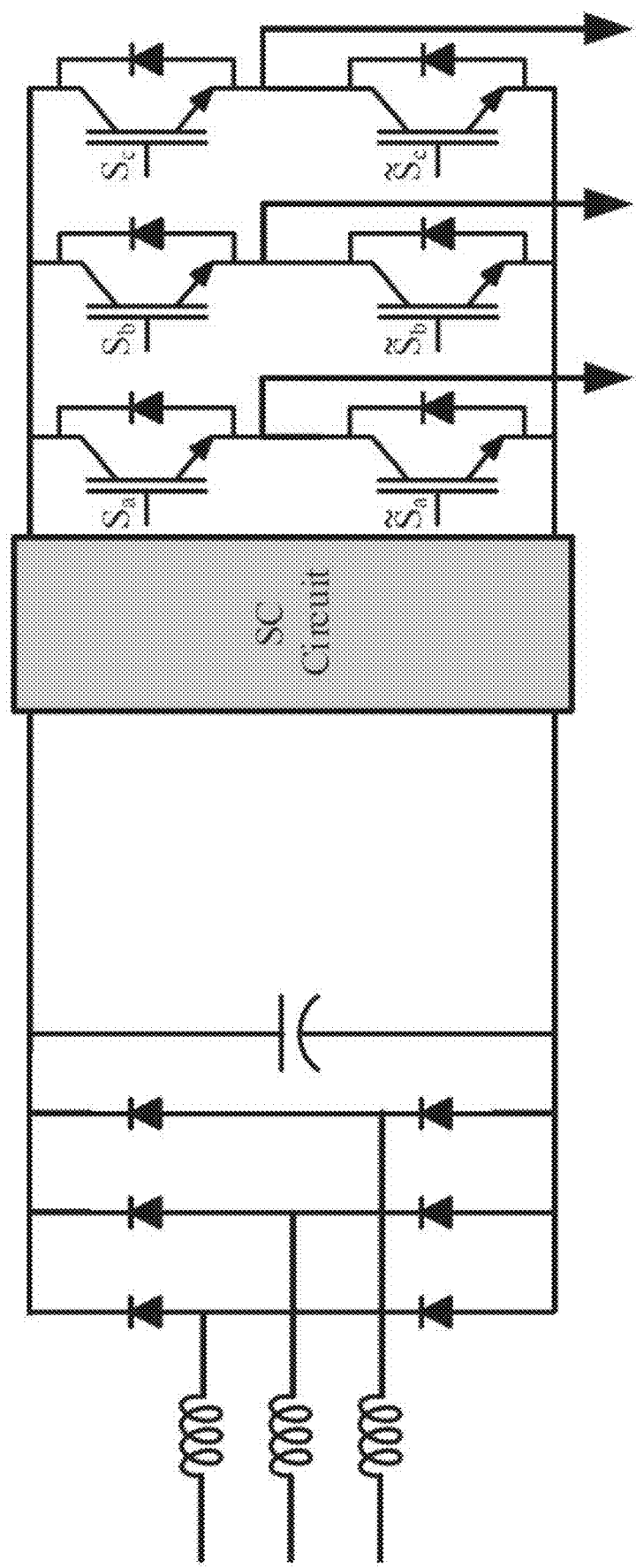
Figure 17:
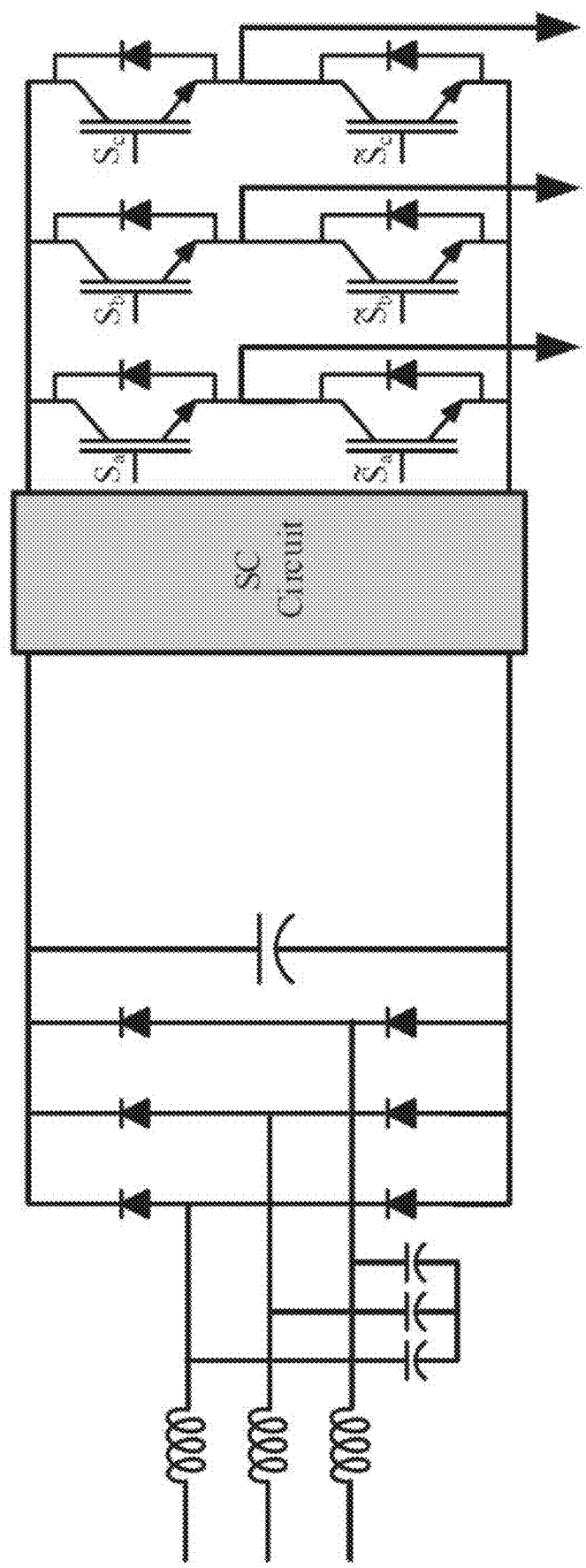

FIG. 9 is another example implementation of a carrier-based modulation 700 with fixed duty ratio of a switch capacitor converter according to the principles of the present disclosure. In various implementations, the carrier-based modulation 700 having fixed duty ratio may be accomplished.

Referring to FIGS. 10-17, alternative example circuit topologies of a SC converter are shown. While each circuit configuration depicted in FIGS. 10-17 include variations of an SC converter, each example embodiment depicts an SC converter operating similar to the SC converter described in the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A voltage conversion system, comprising:
    a switched capacitor circuit;
    a voltage source configured to supply voltage to the switched capacitor circuit; and
    an inverter electrically coupled between the switched capacitor circuit and a load;
    wherein the switched capacitor circuit includes:
        a pair of switches electrically coupled across the voltage source and arrange in series with each other;
        a third switch electrically coupled between a terminal of the voltage source and the inverter; and
        a capacitor electrically coupled between a first node and a second node, where the first node is disposed between the third switch and the inverter and the second node is disposed between the pair of switches.

2. The voltage conversion system of claim 1 wherein the switched capacitor circuit is configured to charge the capacitor with voltage from the voltage source during a charging state and discharge voltage from the capacitor during a discharging state.

3. The voltage conversion system of claim 1 wherein the load is a motor in a vehicle.

4. The voltage conversion system of claim 2 wherein the switched capacitor circuit is configured to place the capacitor is parallel with the load during the charging state and place the capacitor is series with the load during the discharging state.

5. The voltage conversion system of claim 4 wherein the pair of switches is comprised of a first switch electrically coupled to a high side of the voltage source and a second switch electrically coupled electrically coupled to a low side of the voltage source, such that the first switch is open and the second switch is closed during the charging state, and the first switch is closed and the second switch is open during the discharging state.

6. The voltage conversion system of claim 5 wherein the first switch, the second switch and the third switch are further defined as metal oxide semiconductor field effect transistors.

* * * * *